United States Patent
Aydin et al.

(10) Patent No.: US 11,615,555 B2
(45) Date of Patent: Mar. 28, 2023

(54) LEARNING-BASED SAMPLING FOR IMAGE MATTING

(71) Applicant: Disney Enterprises, Inc., Burbank, CA (US)

(72) Inventors: Tunc Ozan Aydin, Zurich (CH); Ahmet Cengiz Öztireli, Zurich (CH); Jingwei Tang, Zurich (CH); Yagiz Aksoy, Zurich (CH)

(73) Assignees: DISNEY ENTERPRISES, INC., Burbank, CA (US); ETH ZÜRICH, (EIDGENÖSSISCHE TECHNISCHE HOCHSCHULE ZÜRICH), Zürich (CH)

( * ) Notice: Subject to any disclaimer, the term of this patent is extended or adjusted under 35 U.S.C. 154(b) by 194 days.

(21) Appl. No.: 17/226,991

(22) Filed: Apr. 9, 2021

(65) Prior Publication Data

US 2021/0225037 A1    Jul. 22, 2021

Related U.S. Application Data

(63) Continuation of application No. 16/408,199, filed on May 9, 2019, now Pat. No. 10,984,558.

(51) Int. Cl.
| | | |
|---|---|---|
| *G06T 7/90* | (2017.01) | |
| *G06T 7/194* | (2017.01) | |
| *G06N 20/00* | (2019.01) | |
| *G06N 3/08* | (2006.01) | |
| *G06T 3/40* | (2006.01) | |
| *G06T 11/00* | (2006.01) | |
| *G06T 11/60* | (2006.01) | |

(52) U.S. Cl.
CPC ............... *G06T 7/90* (2017.01); *G06N 3/08* (2013.01); *G06N 20/00* (2019.01); *G06T 3/40* (2013.01); *G06T 7/194* (2017.01); *G06T 11/001* (2013.01); *G06T 11/60* (2013.01); *G06T 2207/10024* (2013.01); *G06T 2207/20081* (2013.01); *G06T 2207/20084* (2013.01)

(58) Field of Classification Search
CPC ... G06T 7/90; G06T 7/194; G06T 7/11; G06T 3/40; G06T 11/001; G06T 11/60; G06T 2207/10024; G06T 2207/20081; G06T 2207/20084; G06T 2207/10004; G06N 3/08; G06N 20/00; H04N 5/272; H04N 5/275
See application file for complete search history.

(56) References Cited

U.S. PATENT DOCUMENTS

| | | | |
|---|---|---|---|
| 8,175,384 B1 * | 5/2012 | Wang | ..................... G06T 7/194 382/199 |
| 10,657,652 B2 * | 5/2020 | Price | ........................ G06T 7/90 |
| 11,263,259 B2 * | 3/2022 | Shen | ................... G06F 16/5866 |

(Continued)

*Primary Examiner* — John B Strege
(74) *Attorney, Agent, or Firm* — Artegis Law Group, LLP

(57) ABSTRACT

A method of generating a training data set for training an image matting machine learning model includes receiving a plurality of foreground images, generating a plurality of composited foreground images by compositing randomly selected foreground images from the plurality of foreground images, and generating a plurality of training images by compositing each composited foreground image with a randomly selected background image. The training data set includes the plurality of training images.

20 Claims, 6 Drawing Sheets
(1 of 6 Drawing Sheet(s) Filed in Color)

(56) References Cited

U.S. PATENT DOCUMENTS

| | | | |
|---|---|---|---|
| 11,341,733 B2* | 5/2022 | Ikeda | G06K 9/6256 |
| 2018/0260668 A1* | 9/2018 | Shen | G06V 10/56 |
| 2019/0043403 A1* | 2/2019 | Van Droogenbroeck | G09G 3/20 |
| 2019/0251401 A1* | 8/2019 | Shechtman | G06V 30/19173 |
| 2019/0361994 A1* | 11/2019 | Shen | G06N 3/0454 |
| 2020/0218961 A1* | 7/2020 | Kanazawa | G06N 20/20 |
| 2021/0256707 A1* | 8/2021 | Brown | G06N 3/0472 |

* cited by examiner

LEARNING-BASED SAMPLING FOR IMAGE MATTING

CROSS-REFERENCE TO RELATED APPLICATIONS

This application is a continuation of U.S. patent application Ser. No. 16/408,199, filed May 9, 2019. The aforementioned related patent application is herein incorporated by reference in its entirety.

BACKGROUND

Field

This disclosure provides techniques for image matting.

Description of the Related Art

Image matting seeks to estimate the opacities of user-defined foreground objects in an (natural or synthetic) image, i.e., to estimate the soft transitions between foreground that is user-defined and a background, with the soft transitions defining the opacity of the foreground at each pixel. An alpha matte indicating the opacity of the foreground at each pixel (with, e.g., white indicating complete opacity, black indicating complete transparency, and shades of gray indicating partial transparency) may be obtained via image matting, and such an alpha matte is useful in many image and video editing workflows. For example, matting is a fundamental operation for various tasks during the post-production stage of feature films, such as compositing live-action and rendered elements together, and performing local color corrections.

One traditional approach to image matting is through sampling, in which color samples are gathered from known-opacity regions to predict foreground and background layer colors to use for alpha estimation. Such sampling-based matting typically involves selecting a color pair by using the color line assumption and other metrics from the spatial proximity of samples among others. However, an inherent shortcoming of the sampling-based matting approach is the lack of consideration for image structure and texture during the sample selection process. Further, current sampling-based matting approaches are limited to selecting only a single sample pair to represent a pixel's foreground and background colors.

Another traditional approach to image matting is affinity-based matting. Affinity-based matting techniques make use of pixel similarity metrics that rely on color similarity or spatial proximity to propagate alpha values from regions with known opacity. In particular, local affinity definitions, such as the matting affinity, may operate on a local patch around a pixel to determine the amount of information flow and propagate alpha values accordingly. However, affinity-based approaches can suffer from high computational complexity and memory issues.

As traditional approaches for image matting, such as sampling-based matting and affinity-based matting, tend to produce low quality results, current matting practices still require intensive manual labor.

SUMMARY

According to an embodiment, a method of training an image matting machine learning model includes generating a training data set by: receiving a plurality of foreground images, generating a plurality of composited foreground images by compositing randomly selected foreground images from the plurality of foreground images, and generating a plurality of training images by compositing each composited foreground image with a randomly selected background image. The training data set includes the plurality of training images. The method also includes training, using the training data set, at least one of (1) a foreground sampling machine learning network configured to predict a foreground, or (2) a background sampling machine learning network configured to predict a background and training the image matting machine learning model, at least in part, using the training data set and predictions made using the at least one of the foreground sampling machine learning network or the background sampling machine learning network. Other embodiments include an apparatus that performs this method.

According to another embodiment, a method of generating a training data set for training an image matting machine learning model includes receiving a plurality of foreground images, generating a plurality of composited foreground images by compositing randomly selected foreground images from the plurality of foreground images, and generating a plurality of training images by compositing each composited foreground image with a randomly selected background image. The training data set includes the plurality of training images. Other embodiments include an apparatus that performs this method.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

The patent or application file contains at least one drawing executed in color. Copies of this patent or patent application publication with color drawing(s) will be provided by the Office upon request and payment of the necessary fee.

Figure 1:
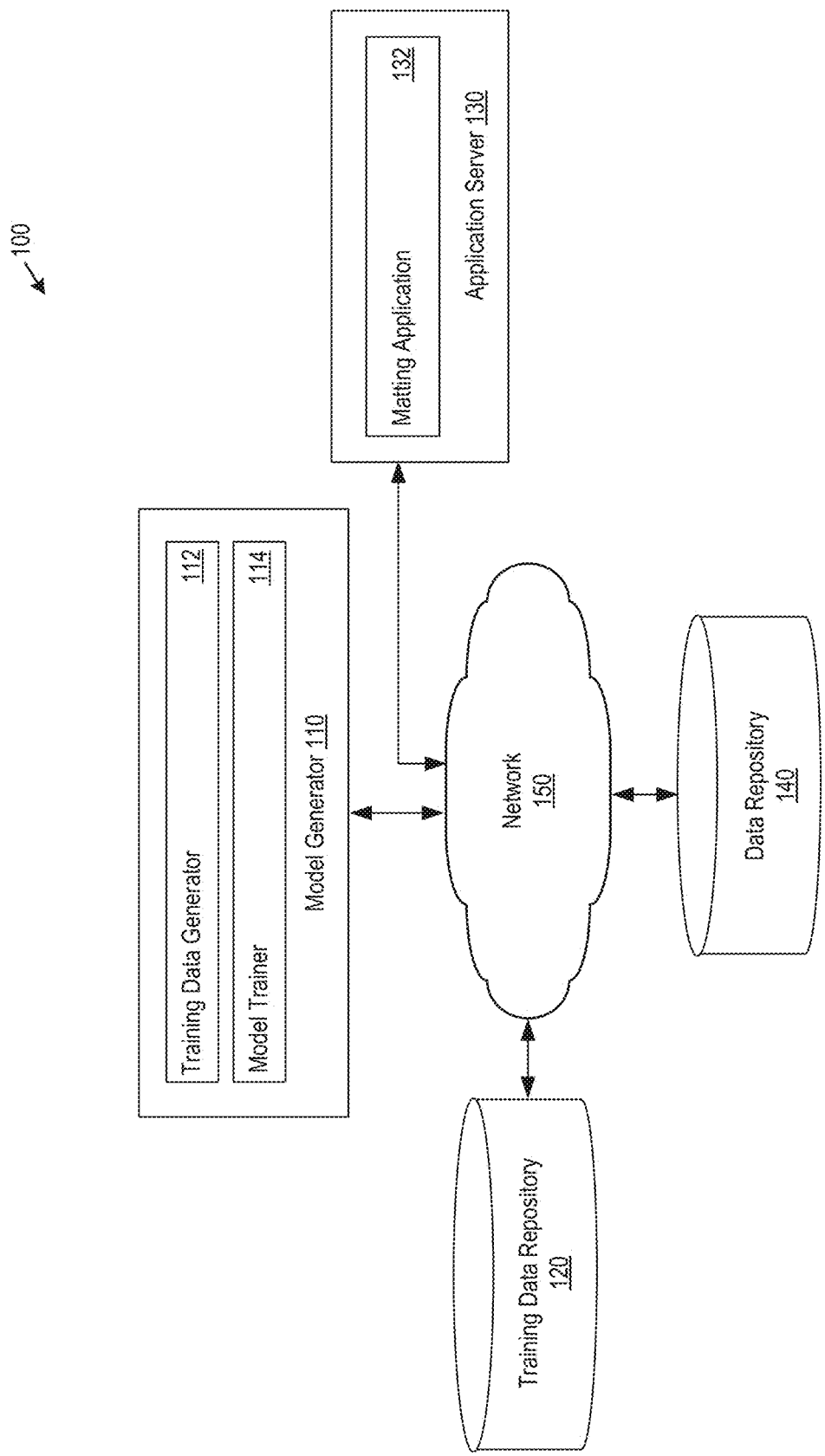

FIG. 1 illustrates an example networked environment in which machine learning models are trained and deployed for image matting, according to an embodiment.

Figure 2:
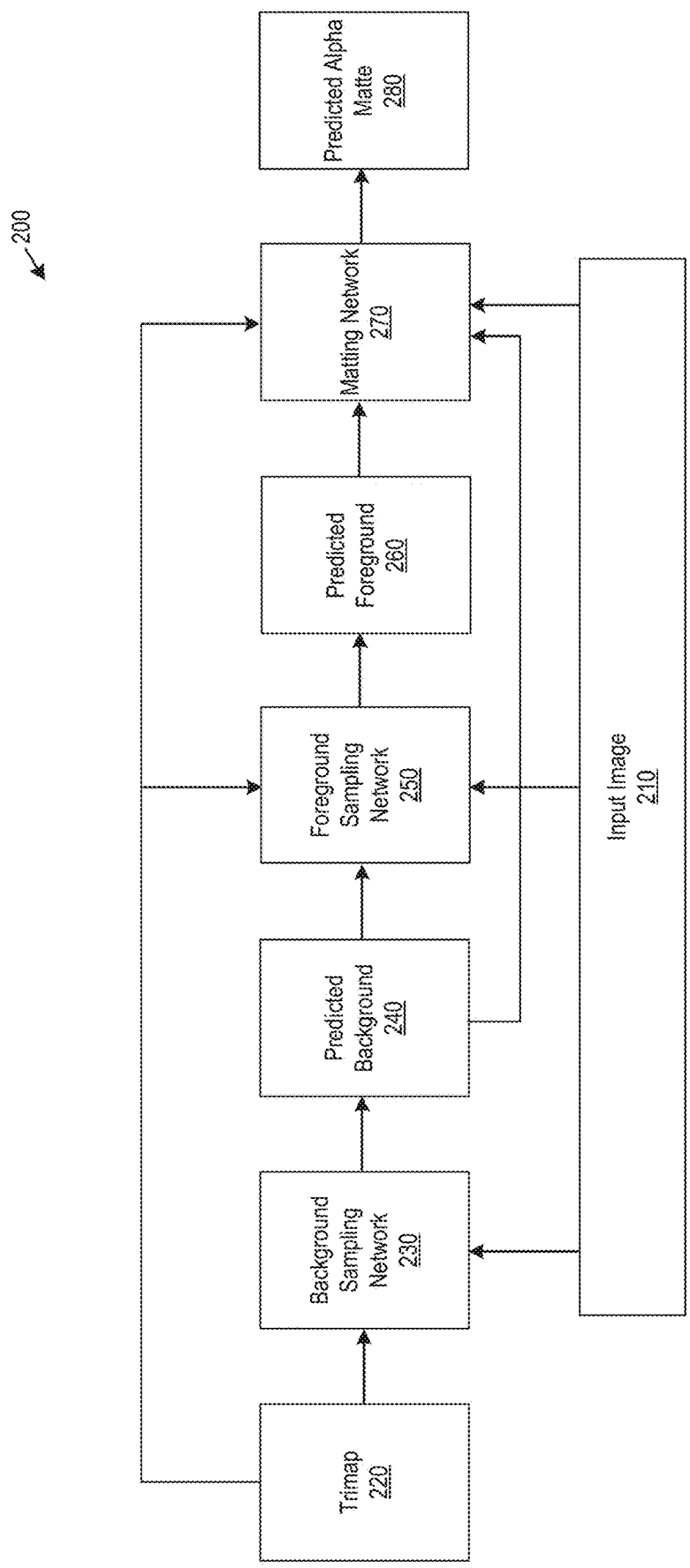

FIG. 2 illustrates a pipeline for determining alpha mattes from input images and trimaps, according to an embodiment.

Figure 3:
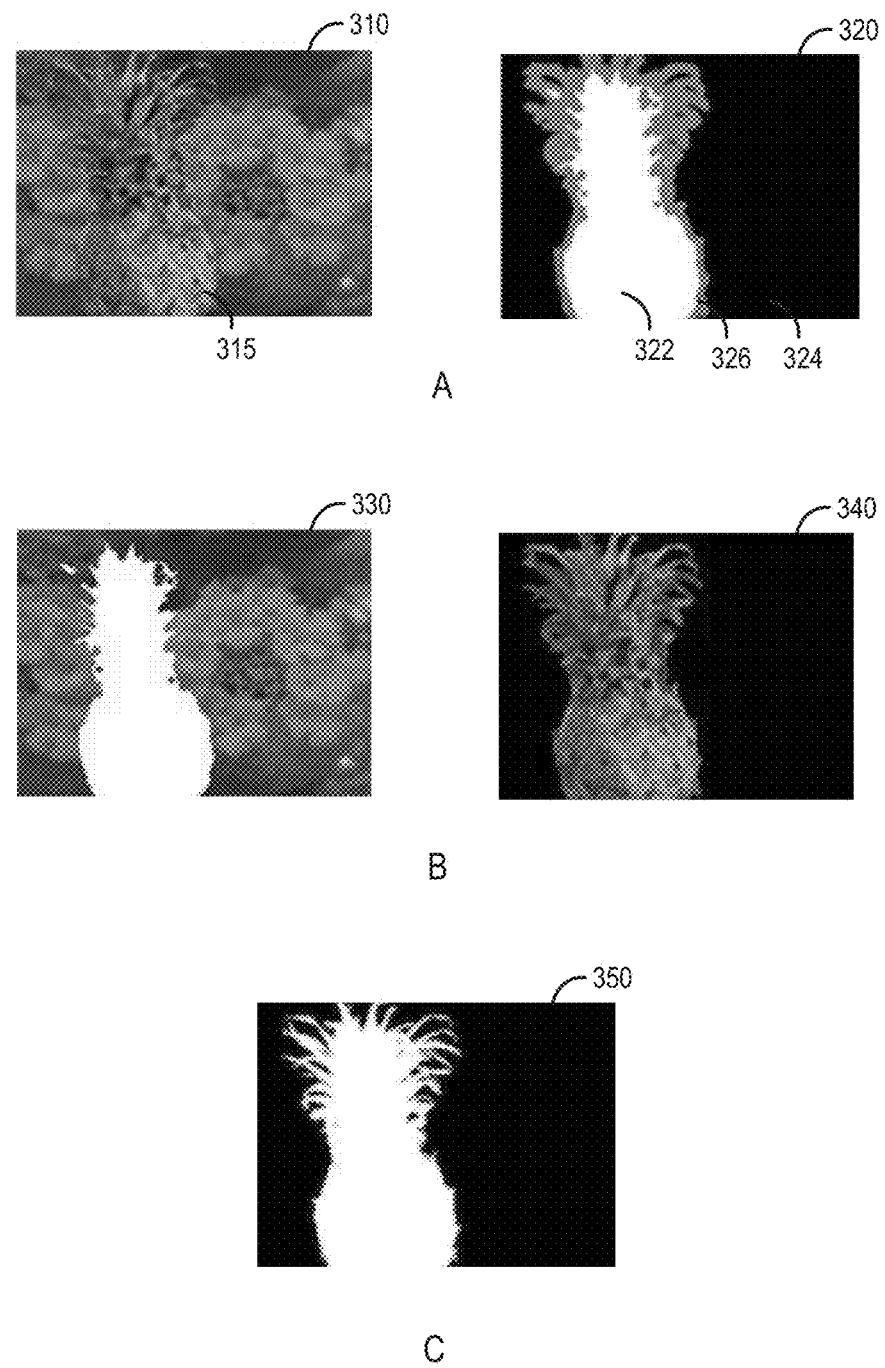

FIG. 3 illustrates examples of an input image and trimap, foreground and background predictions, and an alpha matte prediction, according to an embodiment.

Figure 4:
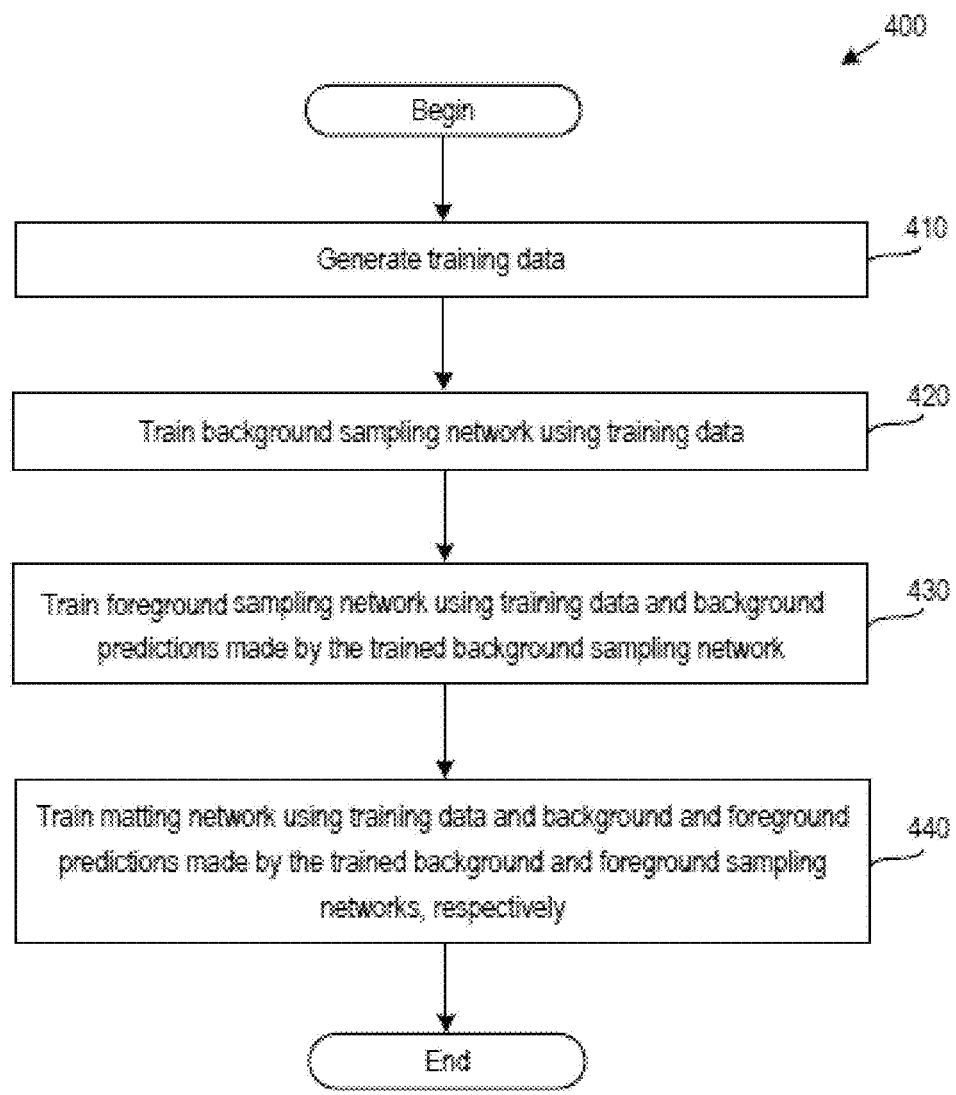

FIG. 4 illustrates a method of training machine learning models for image matting, according to an embodiment.

Figure 5:
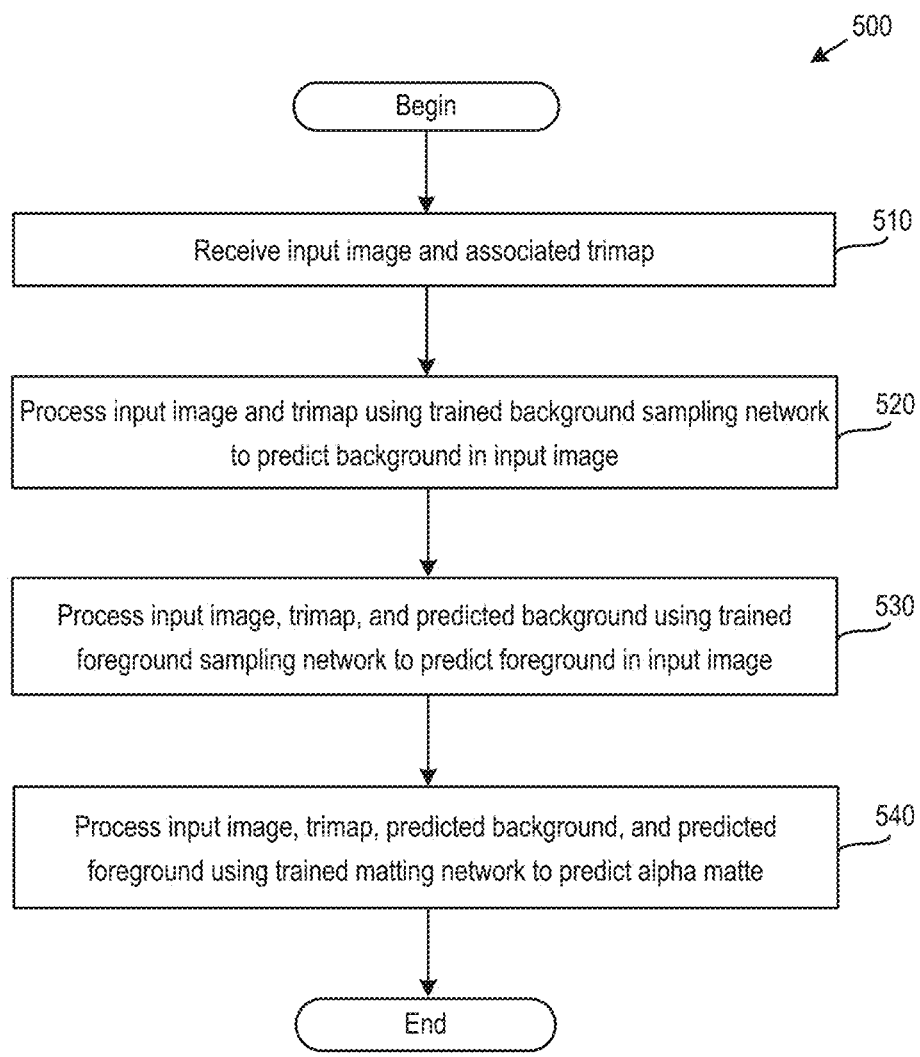

FIG. 5 illustrates a method for image matting, according to an embodiment.

Figure 6:
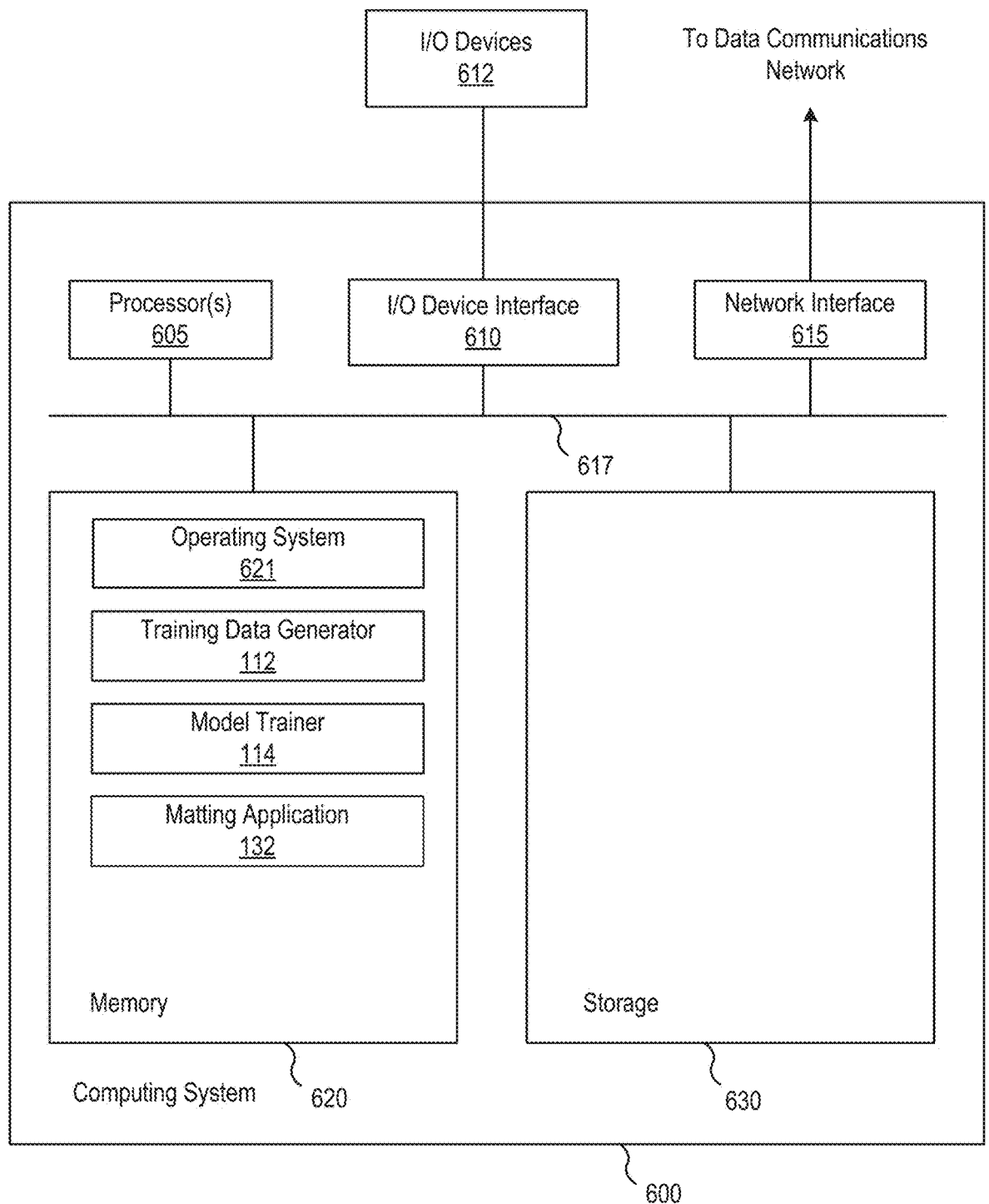

FIG. 6 illustrates a computing system in which an embodiment may be implemented.

DETAILED DESCRIPTION

Embodiments presented herein provide techniques for image matting. In particular, embodiments decompose the matting problem of estimating the opacity of a foreground into the targeted subproblems of estimating a background using a first trained neural network, estimating a foreground using a second neural network and the estimated background as one of the inputs into the second neural network, and estimating an alpha matte using a third neural network and the estimated background and foreground as two of the inputs into the third neural network. That is, rather than estimating foreground and background color pairs together directly for each pixel as in sampling-based matting approaches, embodiments first estimate the background image using its consistent structure, and then estimate foreground colors using the background estimates. Thereafter, the background and foreground color estimates are used, together with an input image and trimap, to estimate an alpha matte. Experience has shown that, by decomposing the matting problem into subproblems that are easier for a neural network to learn compared to traditional data-driven techniques for image matting, embodiments disclosed herein can produce better opacity estimates than traditional data-driven techniques as well as sampling-based and affinity-based matting approaches.

In the following, reference is made to embodiments of the invention. However, it should be noted that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In the context of the present invention, a user may access applications (e.g., a matting application) or related data available in the cloud. For example, a matting application could execute on a computing system in the cloud to perform image matting, and store alpha mattes determined via such matting at a storage location in the cloud. Doing so allows a user to access this information from any computing system attached to a network connected to the cloud (e.g., the Internet).

FIG. 1 illustrates an example networked environment 100 in which machine learning models are trained and deployed for image matting, according to an embodiment. As shown, the networked environment 100 includes a model generator 110, a training data repository 120, an application server 130, and a data repository 140 communicatively connected via a network 150.

The model generator 110 is generally representative of a computing system, such as the system discussed below with respect to FIG. 6. As shown, the model generator 110 includes a training data generating application ("training data generator") 112 and a model training application ("model trainer") 114 running therein. Although shown as being distinct, in some embodiments the training data generator 112 and the model trainer 114 may be implemented as a single application. The training data generator 112 is configured to generate training data that may be stored in the training data repository 120 (or elsewhere) and that is used, in part, by the model trainer 116 to train machine learning models for image matting. In one embodiment, training data may be generated via a data augmentation scheme that creates composite images on the fly using randomizations, as discussed in greater detail below.

The model trainer 116 is configured to train machine learning models, which may include a background sampling network, a foreground sampling network, and matting network. As detailed below, the background sampling network may take as inputs an image and associated trimap and output a predicted background; in turn, the foreground sampling network may take as input the image and trimap, as well as the background predicted by the background sampling network, and output a predicted foreground; then, the matting network may take as inputs the image and trimap, as well as the background predicted by the background sampling network and the foreground predicted by the foreground sampling network, and output a predicted alpha matte. Examples of network architectures for the background sampling network, foreground sampling network, and matting network, as well as training algorithms and loss functions to be minimized during training, are discussed in greater below.

The application server 130 is generally representative of another computing system, the components of which may be similar to those of the model generator 110. As shown, the application server 130 includes a matting application 132 running therein. In one embodiment, the matting application 132 is configured to sequentially utilize the trained background sampling network, the trained foreground sampling network, and the trained matting network to determine an alpha matte given an input image and associated trimap, which may be retrieved from the data repository 140 (or elsewhere), as discussed in greater detail below.

FIG. 2 illustrates a pipeline 200 for determining alpha mattes from input images and trimaps, according to an embodiment. As described, image matting involves estimating the soft transitions between a user-defined foreground and a background of an image, with the soft transitions defining the opacity of the foreground at each pixel. The goal of matting is thus to extract from a given image a foreground layer with correct opacity values and color, such that the extracted foreground layer can be used in compositing operations down the pipeline.

Formally, the color mixtures in soft transitions between foreground and background may be represented with the compositing equation for a given pixel:

$$I_i = a_i F_i + (1-a_i) B_i, \quad (1)$$

where $a_i \in [0,1]$ denotes the opacity of the foreground at pixel i and I, F, and B represent color values of the original image, the foreground, and the background, respectively. The matting problem is under constrained, as the observed color of the pixel $I_i$ in the composite image is known, while the foreground color $F_i$, background color $B_i$, and opacity $a_i$ are to be determined. In addition to the input image I itself, a user may provide as input a trimap which indicates, for every pixel, whether the pixel is a foreground (i.e., opaque, a=1) or background (a=0), or of unknown opacity where alpha values need to be estimated. Embodiments aim to estimate the unknown opacities by making use of the colors of pixels that have been classified by the user as foreground and background in the known-opacity regions.

As shown, the pipeline 200 deconstructs the solution of equation (1) by first estimating the background and foreground parameters in equation (1) using background and foreground sampling networks 230 and 250, respectively, and then estimating opacity using a matting network 270 that takes the estimated foreground and backgrounds as additional input channels, along with an input image 210 and trimap 220. This data-driven approach to color sampling employs targeted neural networks, namely the sampling networks 230 and 250, that estimate background and foreground layer colors while making use of high-level image structure and texture. Traditional sampling-based matting does not make use of the high spatial correlation between colors of neighboring pixels, whereas embodiments exploit such spatial correlations by estimating per-pixel samples while accounting for textures that exist in the foreground and background regions through the use of neural networks. Experience has shown that foreground and background samples estimated by techniques disclosed herein are higher-quality than those estimated using sampling-based matting approaches. Further, by estimating the foreground and background color parameters in equation (1) using sampling networks according to embodiments disclosed herein, the difficulty of estimating corresponding alpha values using a trained neural network is reduced compared to training a neural network to estimate alpha values given only an input image and trimap.

The intuition behind first estimating the background image 240 using its consistent structure, and then estimating the foreground 260 using the background estimates, as opposed to estimating the foreground and background color pairs directly in a single shot for each pixel as in sampling-based approaches, is as follows. As a consequence of the definition of the matting problem, the foreground and background have different characteristics. In particular, the background image may be thought of as a fully opaque layer that is partially obscured by foreground object(s). In other words, a background image with consistent structural and textural properties may be considered to be behind the foreground. By contrast, the foreground layer is spatially limited to the extent of non-opaque regions. This means that colors that participate in mixtures with the background may be expected to have similar color distributions to the fully opaque pixels, but the structural and textural characteristics may differ greatly in partial-opacity regions. Given this intuition, embodiments decompose the matting problem as described above, instead of estimating the foreground and background color pairs together directly for each pixel as in traditional sampling-based approaches.

As shown, the background sampling network 230 takes as inputs the input image 210 and trimap 220 and outputs a predicted background 240. Panel A of FIG. 3 illustrates an example input image 310 and associated trimap 320, and panel B shows an example predicted background 330 that the background sampling network 230 may output given the input image 310 and trimap 320. As shown, the input image 310 depicts a pineapple 315, and the trimap 320 is a user-generated segmentation of the image 310 that includes a region 322, shown in white, that the user is confident is foreground; a region 324, shown in black, that the user is confident is background; and a region 326, shown in gray, whose pixels are not known to be foreground or background and could be a combination of the two (in which the foreground is partially transparent). The goal is then to determine alpha values representing opacity of foreground object(s) in grey areas such as the region 326.

In one embodiment, the background sampling network 230 is a neural network with a two-stage architecture in which both stages are fully convolutional encoder-decoder structures, although other network architectures, such as architectures suitable for inpainting or sampling more generally, may be used in alternative embodiments. For example, a two-stage architecture from image inpainting, which attempts to hallucinate a missing part of an image using the consistent structures and high-level understanding of the overall image, may be used. However, unlike the image inpainting problem, the background image that the background sampling network 230 estimates is partially observed in the input image hidden behind the partially opaque foreground with an unknown alpha matte. To keep the two-stage architecture from hallucinating plausible structures in the unknown region, the background sampling network 230 may be trained to recognize the background structures that are hidden behind the foreground and estimate samples accordingly. In one embodiment, this is achieved by providing the input image 210 as one of the inputs to the background sampling network 230, rather than only providing fully transparent regions defined by the trimap 220. In such a case, the loss function used during training of the background sampling network 230 may be defined over only the unknown-opacity region, as:

$$\mathcal{L}_B = \frac{1}{|U|} \sum_{i \in U} \left| \hat{B}_i - B_i \right|, \qquad (2)$$

where $\hat{B}$ and $B$ denote the predicted and ground-truth background colors, and U is the image region labeled as unknown in the input trimap.

With the additional input of the input image 210 and the use of equation (2), the background sampling network 230 learns not to hallucinate regions but to instead use the partially obstructed background regions as a guide to estimate high-frequency details. This difference is crucial for sampling-based matting, as color values for the background directly affect the matte quality through its use in the compositing equation. It should also be noted that the loss function of equation (2) only includes the unknown-opacity region, as the background colors are irrelevant for the fully-opaque foreground regions in alpha estimation.

In a particular embodiment, the background sampling network 230 may be a neural network with a two-stage architecture. Both stages are fully convolutional encoder-decoder structures. The first stage may take an RGB (red, green, blue) image and a binary mask indicating the inpainting regions as input pairs and output the initial coarse inpainted RGB image. The whole RGB image may be taken as input, rather than the image with white pixels filling in holes, as is typically the case with normal image inpainting tasks. Doing so shifts the network's functionality of purely hallucinating missing colors to instead distinguishing background colors from mixed input colors through further training with whole RGB image input. In addition, for the image matting task, the binary mask may come directly from the trimap 320, and the unknown and foreground regions of the trimap 320 are the inpainting region during background sampling. The second stage of the two-stage architecture further takes the coarse prediction from the first stage along with the binary mask as inputs and predicts final results. The second stage may include two parallel encoders: a dilational convolution branch specifically focused on hallucinating contents with layer-by-layer dilated convolution, and a contextual attention branch that tries to attend on distant background features of interest. In terms of implementation, the background sampling network 230 may use zero-padding for each convolutional layer, with no batch normalization layers, the exponential linear unit (ELU) may be used rather than the rectifier linear unit (ReLU) as the activation function, output filter values may be clipped rather than activated by tanh or sigmoid functions, and the Nearest Neighbor method may be used in the upsample layer.

Once background samples are estimated, the foreground sampling problem boils down to choosing plausible colors from the known fully-opaque foreground regions that best represent color mixtures observed in the input image 210. Background sampling performed prior to foreground sampling in embodiments, as the background may be more uniform than the foreground which may have, e.g., varied textures, making the likelihood higher of finding better background samples. Returning to FIG. 2, the foreground sampling network 250 receives the input image 210 and trimap 220, as well as the predicted background 240, as inputs. In turn, the foreground sampling network 250 processes such inputs and outputs a predicted foreground 260. Panel B of FIG. 3 illustrates an example foreground 340 that the foreground sampling network 240 may output given the input image 310, the trimap 320, and the predicted background 330.

In one embodiment, the foreground sampling network 250 is, like the background sampling network 230, a neural network with a two-stage architecture in which both stages are fully convolutional encoder-decoder structures, although other network architectures, such as architectures suitable for inpainting or sampling more generally, may be used in alternative embodiments. In such a case, the loss function used to train the foreground sampling network 250 may be composed of two terms added together:

$$L_F = L_{fg} + L_{comp}. \quad (3)$$

The first term $L_{fg}$ in the loss function of equation (3) is the $L^1$ loss analogous to background sampling:

$$\mathcal{L}_{fg} = \frac{1}{|U|} \sum_{i \in U} \left| \hat{F}_i - F_i \right|, \quad (4)$$

where $\hat{F}$ and $F$ denote the predicted and ground-truth foreground colors. This term simply changes the binary mask to assign background and unknown area of trimap 320 to be the inpainting region and incurs loss on the differences between ground-truth and predicted foreground colors in the unknown region U. However, sampling foreground is more challenging than sampling background colors, as foreground inpainting regions are typically larger than those in background inpainting and are connected to the boundaries of images, and, unlike background colors, foreground colors are typically of high frequency. To alleviate these problems, background colors and alpha mattes may be utilized during training to help the foreground sampling network 250. To use background colors, the foreground sampling network 250 may take background colors predicted from the fully trained background sampling network 230 as extra input channels (e.g., 7 channels rather than 4) to gain more information. In one embodiment, the extra weights in the first convolutional layer of the foreground sampling network 250 may be initialized with Xavier random variables. To use alpha mattes, an additional compositional loss may be added to the foreground prediction loss $L_f$ to guide the network to learn predicting foreground colors in the manner defined by equation (1). The second term in the loss function of equation (3) is such a compositional loss that penalizes deviations of an intermediate composite image by using equation (1) with predicted background and foreground colors, and ground-truth alpha mattes from the reference composite input image I:

$$\mathcal{L}_{comp} = \frac{1}{|U|} \sum_{i \in U} \left| \alpha_i \hat{F}_i + (1-\alpha_i) \hat{B}_i - I_i \right|. \quad (5)$$

Here, the ground-truth alpha matte, ground-truth background, and predicted foreground are used together to compute a predicted composited RGB image $a_i \hat{F}_i + (1-a_i) \hat{B}_i$, and the predicted RGB image is compared with the ground-truth RGB image in $L_1$ distance. It should be noted that, although ground-truth alpha mattes are used during training of the foreground sampling network 250 through the compositional loss, the alpha matte is not needed when estimating foreground samples in the final system in forward passes.

In a particular embodiment, a weighted version of the compositional loss may be employed in which an ad hoc weight is applied depending on the ground-truth a pixel-wisely to the $L_1$ distance between predicted and ground-truth composited images. In such a case, for each pixel i, the weight may be computed as:

$$\omega^i = \begin{cases} 3\alpha^i + \frac{1}{4}, & \text{for } \alpha^i \in [0, 0.5] \\ -3\alpha^i + \frac{13}{4}, & \text{for } \alpha^i \in [0.5, 1] \end{cases}, \quad (6)$$

The weighted compositional loss may then be computed as:

$$\mathcal{L}_{wcomp} = \frac{1}{|U|} \sum_{i \in U} \omega_i \left| \hat{I}_i - I_i \right|, \quad (7)$$

where $\hat{I} = a\hat{F} + (1-a)\hat{B}$. Adding a weight to the compositional loss aims to increase the influence of the compositional loss term where a is close to 0.5, indicating final image colors are almost equally blended between foreground and background colors and to decrease the influence of the compositional loss term where a is close to 0 or 1, meaning the image color is almost the same as the foreground or background color. The final loss may then be the weighted sum of the foreground prediction loss and the weighted compositional loss:

$$L_F = L_{fg} + \lambda_{comp} L_{comp} \quad (8)$$

Experience has shown that the background and foreground sampling networks disclosed herein are able to generate spatially smooth color predictions that match well with actual colors that form mixtures in images, in contrast to traditional sampling-based matting approaches that generated noisy sampling results. Further, due to the common use of the color line model to select samples, traditional approaches can incorrectly choose foreground samples that are very similar to the actual background color in transparent regions, and vice versa, resulting in low-quality alpha predictions.

Returning to FIG. 2, after the predicted foreground 260 is determined using the foreground sampling network 250, then the matting network 270 is further used to process the input image 210, the trimap 220, the predicted background 240, and the predicted foreground 260. In turn, the matting network 270 outputs the predicted alpha matte 280 corresponding to the input image 210. Panel B of FIG. 3 illustrates an example alpha matte 350 that the matting network 270 may output given the input image 310, the trimap 320, the predicted background 330, and the predicted foreground 340.

In one embodiment, the matting network 270 is a generative adversarial network (GAN), although other network architectures such as an encoder-decoder architecture or the Deep Mating architecture may be used in alternative embodiments. A GAN may be implemented as a system of two artificial neural networks, a generative model that is trained to map inputs to a desired data distribution and a discriminative model that is trained to evaluate the probability that a sample came from training data rather than the generative model. In a particular embodiment, an Alpha-GAN architecture, which includes a generative model that is a convolutional encoder-decoder network trained both with the help of ground-truth alphas as well as the adversarial loss from a discriminative network, may be used. In such a case, the input to the encoder may include channels: three (red, green, and blue) from the RGB image 210, one from the trimap 220, three from the background colors 240, and three from the foreground colors 260.

In one embodiment, the matting network 270 may be trained using a loss function that includes the alpha prediction loss $L_{alpha}$ and compositional loss $L_{comp}$ used to train the Deep Matting network, which together are referred to herein as $L_{dm}$, as well as an additional loss $L_{grad}$ that is defined over alpha gradients. The alpha prediction loss $L_{alpha}$ may be approximated as $$\mathcal{L}_{alpha}^i = \sqrt{(\alpha_p^i - \alpha_g^i)^2 + \epsilon^2},$$

where $a_p^i$ is the output of the prediction layer at pixel i, and the compositional loss $L_{comp}$ may be approximated as $$\mathcal{L}_{comp}^i = \sqrt{(c_p^i - c_g^i)^2 + \epsilon^2},$$

where c is the RGB channel, p is the image composited by a predicted alpha, and g is the image composited by ground truth alphas. However, experience has shown that the alpha prediction loss $L_{alpha}$ and compositional loss $L_{comp}$ do not properly promote sharpness in alpha mattes. This issue is addressed using the $L_{grad}$ loss that is defined over alpha gradients defined as the $L^1$ distance between the spatial gradient of predicted and ground-truth alpha mattes:

$$\mathcal{L}_{grad} = \frac{1}{|U|} \sum_{i \in U} \left| \hat{G}_i - G_i \right|, \quad (9)$$

where $\hat{G}$ and G denote the gradient magnitude of predicted and ground-truth alpha mattes, respectively. It should be noted that, rather than operating on color values as the alpha prediction loss $L_{alpha}$ and compositional loss $L_{comp}$ do, the $L_{grad}$ loss ensures that alpha gradients are also considered during the training process. The final matting loss that includes the alpha prediction loss $L_{alpha}$, the compositional loss $L_{comp}$, and the $L_{grad}$ loss over alpha gradients may be defined as:

$$L_{matting} = L_{dm} + L_{grad} \quad (10)$$

Experience has shown that the loss of equation (10) promotes sharp results that effectively capture high-frequency alpha changes. Intuitively, ensuring that gradients are preserved in the alpha matte may help produce better results in regions having smooth transitions of gradients.

FIG. 4 illustrates a method 400 of training machine learning models for image matting, according to an embodiment. As shown, the method 400 begins at step 410, where the training data generator 112 generates training data. In one embodiment, the training data generator 112 may generate training data for training the foreground and background sampling networks using similar preprocessing as for training Deep Matting network. The training data generator 112 may further generate training data for training the matting network from a set of unique foreground images and corresponding alpha mattes, and using a data augmentation scheme that creates new composite images on the fly by many randomizations. In one embodiment, the randomizations may include extending the number of distinct ground-truth mattes by compositing two random foreground images on top of each other with a probability of 0.5. The corresponding trimaps may then be defined, again on the fly, by dilating the foreground by a random number of pixels ranging from, e.g., 1 to 19. Doing so creates greater variability in terms of ground-truth mattes and trimaps, and provides better generalizability as images with sharp opacity boundaries and large transparent regions are randomly combined to create hybrid scenes. The randomizations may further include, after the foreground images are selected and mixed, selecting a number (e.g., 8) of random background images and creating composite images, which are then fed to the matting network as a batch. Using the same foreground with different backgrounds in a batch increase the invariance of the matte estimation with respect to the background image. Selecting the background images randomly at each iteration instead of defining a pre-determined set results in the network seeing new input images throughout the training process, which also helps with generalizability of the final network. In addition, the randomizations may include applying random scaling to the input images before feeding them to the network. That is, images may be randomly resized to, e.g., 480×480 or 640×640 before cropping patches from those images. As a result, the network sees not only zoomed-in versions of the input images, but also the input images as a whole, allowing the network to better generalize in terms of image scale.

During the training of the foreground sampling network 230, the training data generator 112 may further employ an additional processing step to enlarge the foreground set, by, e.g., enhancing each foreground image before composition by randomly changing its brightness, contrast, and saturation within the range [0.5, 1.5] according to a truncated Gaussian distribution with $\mu=1$ and $\sigma=0.2$. The hue of the foreground image may also be randomly shifted within the range [−0.2, 0.2] according to another truncated Gaussian distribution with $\mu=0$ and $\sigma=0.1$.

At step 420, the model trainer 114 trains a background sampling network using the training data generated at step 410 (using the Deep Matting preprocessing for the background sampling network). In one embodiment, the background sampling network may have a two-stage architecture, as described above, and be trained using the loss function of equation (2) that is only defined over unknown-opacity region(s) (indicated by trimaps associated with images in the training data). Any suitable training algorithm may be used, depending on the type of background sampling network chosen. In a particular embodiment, the training may start from a pre-trained model, such as the inpainting model discussed above, and use the Adam optimizer with $\beta_1=0.9$ and $\beta_2=0.999$ for back propagation, with a constant learning rate of, e.g., $10^{-5}$.

At step 430, the model trainer 114 trains a foreground sampling network using the training data generated at step 410 (using the Deep Matting preprocessing for the foreground sampling network) and background predictions made by the trained background sampling network. In one embodiment, the foreground sampling network may have a two-stage architecture, and be trained using the loss function of equation (3) that includes a $L^1$ loss of equation (4), which is defined over unknown-opacity region(s), and the compositional loss of equation (5), which penalizes deviations of an intermediate composite image, as described above. Similar to the training of the background sampling network at step 420, any suitable training algorithm may be used to train the foreground sampling network, depending on the type of foreground sampling network chosen, and in a particular embodiment the training may start from a pre-trained model and use the Adam optimizer with a constant learning rate.

At step 440, the model trainer 114 trains a matting network using the training data generated at step 410 (for training the matting network), as well as background and foreground predictions made by the trained background and foreground sampling networks, respectively. In particular, the matting network is trained to output a single channel for the alpha matte. In one embodiment, the matting network is trained using the loss function of equation (10), which includes an Alpha prediction loss $L_{alpha}$, a compositional loss $L_{comp}$, and the $L_{grad}$ loss of equation (9) that is defined as the $L^1$ distance between the spatial gradient of predicted and ground-truth alpha mattes, as discussed above. Once again, any suitable training algorithm may be used to train the matting network, depending on the type of matting network chosen.

In some embodiments, the matting network may further be trained to be specialized for specific types of scenes. For example, additional training using data from a specific film franchise could be used to improve the matte quality generated for image frames of films of the same franchise. Here, it is assumed that the overall appearance of image frames from the same film franchise are similar to each other, such that training within this relatively lower dimensional space will be easier than training with completely random images. In particular, if the post-processing of films from the same film franchise were performed in a similar manner, such as using the same color grading, or if the same characters or objects appear in the films, the dimensionality of the problem may be reduced. For example, if the networks were to be trained on a series of films in which most shots are shot with similar lighting, are color graded the same way, involve the same characters, take place in similar places, etc., then the networks may work better on a future installment of the same film franchise that involves the same characteristics. In one embodiment, the model trainer 114 may start with already trained networks, and train those networks further with new data such as data from a specific film franchise.

FIG. 5 illustrates a method 500 for image matting, according to an embodiment. As shown, the method 500 begins at step 510, where the matting application 132 receives an input image and an associated trimap. As described, the trimap may indicate foreground region(s), background region(s), and region(s) of unknown opacity in the input image, with the goal of matting being to predict the opacity of the foreground at each pixel in the unknown opacity region(s).

At step 520, the matting application 132 processes the input image and trimap using a trained background sampling network to predict a background in the input image. As described, the background sampling network takes an RGB image and trimap as inputs and is trained to fill in missing background colors, thereby predicting the background of the input image.

At step 530, the matting application 132 processes the input image, trimap, and predicted background using a trained foreground sampling network to predict a foreground in the input image. As described, the foreground sampling network is trained to take an RGB image and trimap, along with the background predicted at step 520, as inputs and to predict foregrounds colors given such inputs.

At step 540, the matting application 132 processes the input image, trimap, predicted background, and predicted foreground using a trained matting network to predict an alpha matte. As described, the matting network uses all available information, including the RGB image, the trimap, as well as the background predicted at step 520 and the foreground predicted at step 530, to predict an alpha matte. That is, the foreground and background predictions made at steps 520 and 530 are input into the matting network as image channels, in addition to the RGB and trimap image channels. In turn, the matting network outputs a single channel for the alpha matte.

FIG. 6 illustrates a computing system 600 in which an embodiment may be implemented. As shown, the computing system 600 combines the model generator 110 and the application server 130 discussed above for simplicity, but it should be understood that the model generator 110 and the application server 130 may also be implemented as distinct computing systems. Illustratively, the system 600 includes, without limitation, a central processing unit (CPU) 605, a network interface 615 connecting the system to a network 616, an interconnect 617, a memory 620, and storage 630. The system 600 may also include an I/O device interface 610 connecting I/O devices 612 (e.g., keyboard, display and mouse devices) to the system 600.

The CPU 605 retrieves and executes programming instructions stored in the memory 620. Similarly, the CPU 605 stores and retrieves application data residing in the memory 620. The interconnect 617 facilitates transmission, such as of programming instructions and application data, between the CPU 605, I/O device interface 610, storage 630, network interface 615, and memory 620. CPU 605 is included to be representative of a single CPU, multiple CPUs, a single CPU having multiple processing cores, one or more graphics processing units (GPUs), a combination of the above, and other types of processor(s). And the memory 620 is generally included to be representative of a random access memory. The storage 630 may be a disk drive storage device. Although shown as a single unit, the storage 630 may be a combination of fixed and/or removable storage devices, such as magnetic disk drives, flash drives, removable memory cards or optical storage, network attached storage (NAS), or a storage area-network (SAN). Further, the system 600 is included to be representative of a physical computing system as well as virtual machine instance(s) hosted on underlying physical computing system(s). Further still, although shown as a single computing system, one of ordinary skill in the art will recognize that the components of the system 600 shown in FIG. 6 may be distributed across multiple computing systems connected by a data communications network.

As shown, the memory 620 includes an operating system 621, the training data generator 112, the model trainer 114, and the matting application 132. The operating system 621 may be, e.g., Linux® or Microsoft Windows®. As described, the training data generator 112 is configured to generate training data; the model trainer 114 is configured to sequentially train a background sampling network, a foreground sampling network, and a matting network; and the matting application 132 is configured to process an input image and associated trimap using the trained background and foreground sampling networks and the trained matting network in order to determine an alpha matte. In one embodiment, the training data generator 112 generates training data, after which the model trainer 114 trains a background sampling network using the generated training data; trains a foreground sampling network using the generated training data and background predictions made by the trained background sampling network; and trains a matting network using the generated training, as well as background and foreground predictions made by the trained background and foreground sampling networks, respectively, according to the method 400 discussed above with respect to FIG. 4. After the foreground and background sampling networks and the matting network have been trained, the matting application 132 may receive an input image and an associated trimap; process the input image and trimap using the trained background sampling network to predict a background in the input image; process the input image, trimap, and predicted background using the trained foreground sampling network to predict a foreground in the input image; and process the input image, trimap, predicted background, and predicted foreground using the trained matting network to predict an alpha matte, according to the method 500 discussed above with respect to FIG. 5.

Advantageously, techniques disclosed herein permit image matting with learning-based sampling. Sampling networks are disclosed for estimating background and foreground layer colors while making use of high-level image structure and texture, in contrast to the limited set of selected samples used by traditional sampling-based matting approaches. Experience has shown that by inputting foreground and background samples estimated using such sampling networks into a matting neural network, along with an input image and trimap, techniques disclosed herein can achieve improvements in opacity estimation over traditional hand-crafted sampling approaches and affinity-based matting, as well as previous data-driven techniques that directly solve the compositing equation for alpha values. The matting network itself may also be trained using a loss that is defined over alpha gradients, which helps promote proper sharpness in alpha mattes (which may effectively capture high-frequency alpha changes) produced by the matting network, in contrast to the traditional alpha prediction loss and compositional loss that have been used. Techniques disclosed herein may fix various issues in traditional sampling-based matting and affinity-based matting approaches and data-driven techniques, such as the inability of traditional sampling approaches to produce satisfactory results in many cases, the problems encountered with affinity-based matting when the background or foreground colors in an unknown region does not clearly appear in the known regions of a trimap, and the smoothness issues and erroneous low-alpha values in high-transparency images produced by traditional data-driven techniques. Further, the accuracy of alpha mattes and foreground colors produced by techniques disclosed herein may enable practical compositing applications, such as foreground extraction and background replacement. Additional advantages include the possibility of implementing techniques disclosed herein without compromising matte quality, with embodiments potentially being ported to various platforms (including platforms that can benefit from improved processing hardware). Interactive computation rates are also possible, as the processing amounts to a forward pass step of neural networks. In addition, techniques disclosed herein may be used to train neural networks that are specialized for specific types of scenes.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of training an image matting machine learning model, the method comprising:
 generating a training data set by:
  receiving a plurality of foreground images;
  generating a plurality of composited foreground images by compositing randomly selected foreground images from the plurality of foreground images; and
  generating a plurality of training images by compositing each composited foreground image with a randomly selected background image, wherein the training data set includes the plurality of training images;
 training, using the training data set, at least one of (1) a foreground sampling machine learning network configured to predict a foreground, or (2) a background sampling machine learning network configured to predict a background; and
 training the image matting machine learning model, at least in part, using the training data set and predictions made using the at least one of the foreground sampling machine learning network or the background sampling machine learning network.

2. The method of claim 1, wherein the image matting machine learning model is trained, at least in part, using the training data set, the predictions made using the foreground sampling machine learning network, and the predictions made using the background sampling machine learning network.

3. A method of generating a training data set for training an image matting machine learning model, the method comprising:
 receiving a plurality of foreground images;
 generating a plurality of composited foreground images by compositing randomly selected foreground images from the plurality of foreground images; and
 generating a plurality of training images by compositing each composited foreground image with a randomly selected background image, wherein the training data set comprises the plurality of training images.

4. The method of claim 3, wherein the training data set further comprises the plurality of foreground images.

5. The method of claim 3, wherein generating the plurality of composited foreground images comprises compositing two randomly selected foreground images on top of each other with a predefined probability.

6. The method of claim 3, further comprising generating a respective trimap for each composited foreground image.

7. The method of claim 6, wherein generating the respective trimap for each composited foreground image comprises dilating a foreground in the composited foreground image by a random number of pixels.

8. The method of claim 3, further comprising, prior to generating the plurality of composited foreground images, randomly changing at least one of a brightness, a contrast, a saturation, or a hue of at least one foreground image of the plurality of foreground images to generate at least one additional foreground image, wherein generating the plurality of training images further comprises compositing the at least one additional foreground image with a randomly selected background image.

9. The method of claim 8, wherein at least one of the brightness, the contrast, the saturation, or the hue of the at least one foreground image is changed according to a truncated Gaussian distribution.

10. The method of claim 3, further comprising:
applying random scaling to at least one training image of the plurality of training images to generate at least one randomly-scaled training image; and
cropping at least one patch from the at least one randomly-scaled training image generate at least one cropped randomly-scaled training image, wherein the training data set further comprises the at least one cropped randomly-scaled training image.

11. The method of claim 3, wherein generating the plurality of training images comprises:
compositing a first composited foreground image of the plurality of composited foreground images with a first randomly selected background image to generate a first training image of the training data set; and
compositing the first composited foreground image with a second randomly selected background image, different from the first randomly selected background image, to generate a second training image of the training data set.

12. An apparatus for generating a training data set for training an image matting machine learning model, the apparatus comprising:
a memory; and
a hardware processor communicatively coupled to the memory, the hardware processor configured to:
receive a plurality of foreground images;
generate a plurality of composited foreground images by compositing randomly selected foreground images from the plurality of foreground images; and
generate a plurality of training images by compositing each composited foreground image with a randomly selected background image, wherein the training data set comprises the plurality of training images.

13. The apparatus of claim 12, wherein the training data set further comprises the plurality of foreground images.

14. The apparatus of claim 12, wherein generating the plurality of composited foreground images comprises compositing two randomly selected foreground images on top of each other with a predefined probability.

15. The apparatus of claim 12, the hardware processor further configured to generate a respective trimap for each composited foreground image.

16. The apparatus of claim 15, wherein generating the respective trimap for each composited foreground image comprises dilating a foreground in the composited foreground image by a random number of pixels.

17. The apparatus of claim 12, wherein the hardware processor is further configured to, prior to generating the plurality of composited foreground images, randomly change at least one of a brightness, a contrast, a saturation, or a hue of at least one foreground image of the plurality of foreground images to generate at least one additional foreground image, wherein generating the plurality of training images further comprises compositing the at least one additional foreground image with a randomly selected background image.

18. The apparatus of claim 17, wherein at least one of the brightness, the contrast, the saturation, or the hue of the at least one foreground image is changed according to a truncated Gaussian distribution.

19. The apparatus of claim 12, wherein the hardware processor is further configured to:
apply random scaling to at least one training image of the plurality of training images to generate at least one randomly-scaled training image; and
crop at least one patch from the at least one randomly-scaled training image to generate at least one cropped randomly-scaled training image, wherein the training data set further comprises the at least one cropped randomly-scaled training image.

20. The apparatus of claim 12, wherein generating the plurality of training images comprises:
compositing a first composited foreground image of the plurality of composited foreground images with a first randomly selected background image to generate a first training image of the training data set; and
compositing the first composited foreground image with a second randomly selected background image, different from the first randomly selected background image, to generate a second training image of the training data set.

* * * * *

UNITED STATES PATENT AND TRADEMARK OFFICE
CERTIFICATE OF CORRECTION

PATENT NO. : 11,615,555 B2
APPLICATION NO. : 17/226991
DATED : March 28, 2023
INVENTOR(S) : Tunc Ozan Aydin et al.

It is certified that error appears in the above-identified patent and that said Letters Patent is hereby corrected as shown below:

In the Claims

Column 17, Claim 10, Line 21, please insert --to-- after image.

Signed and Sealed this
Thirtieth Day of May, 2023

Katherine Kelly Vidal
*Director of the United States Patent and Trademark Office*